Feb. 3, 1959  M. E. McCLELLAN  2,871,643
AGRICULTURAL CROP-HANDLING MACHINE
Filed Oct. 5, 1953  4 Sheets-Sheet 1
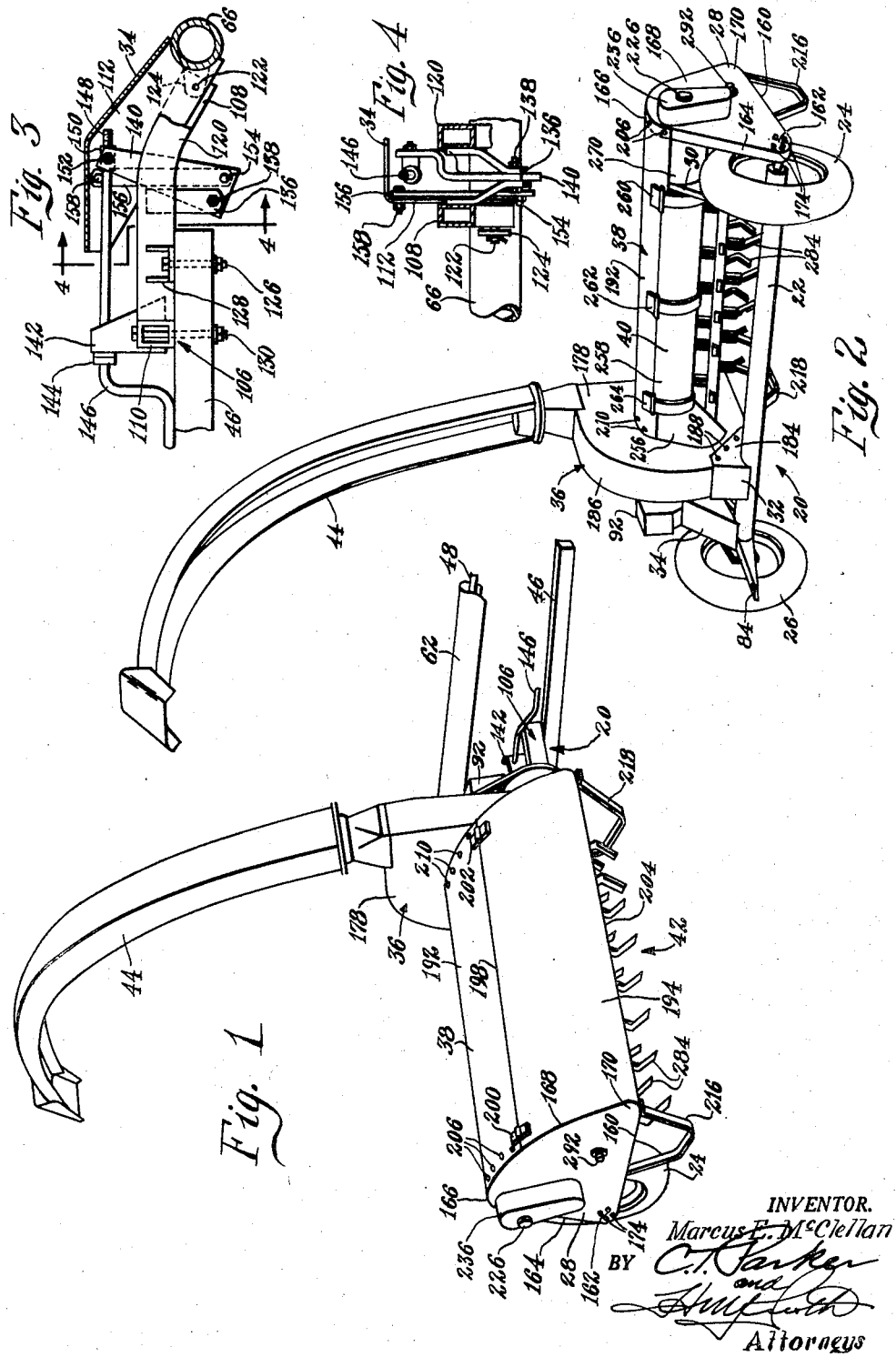
INVENTOR.
Marcus E. McClellan
BY
Attorneys Feb. 3, 1959 M. E. McCLELLAN 2,871,643
AGRICULTURAL CROP-HANDLING MACHINE
Filed Oct. 5, 1953 4 Sheets-Sheet 2
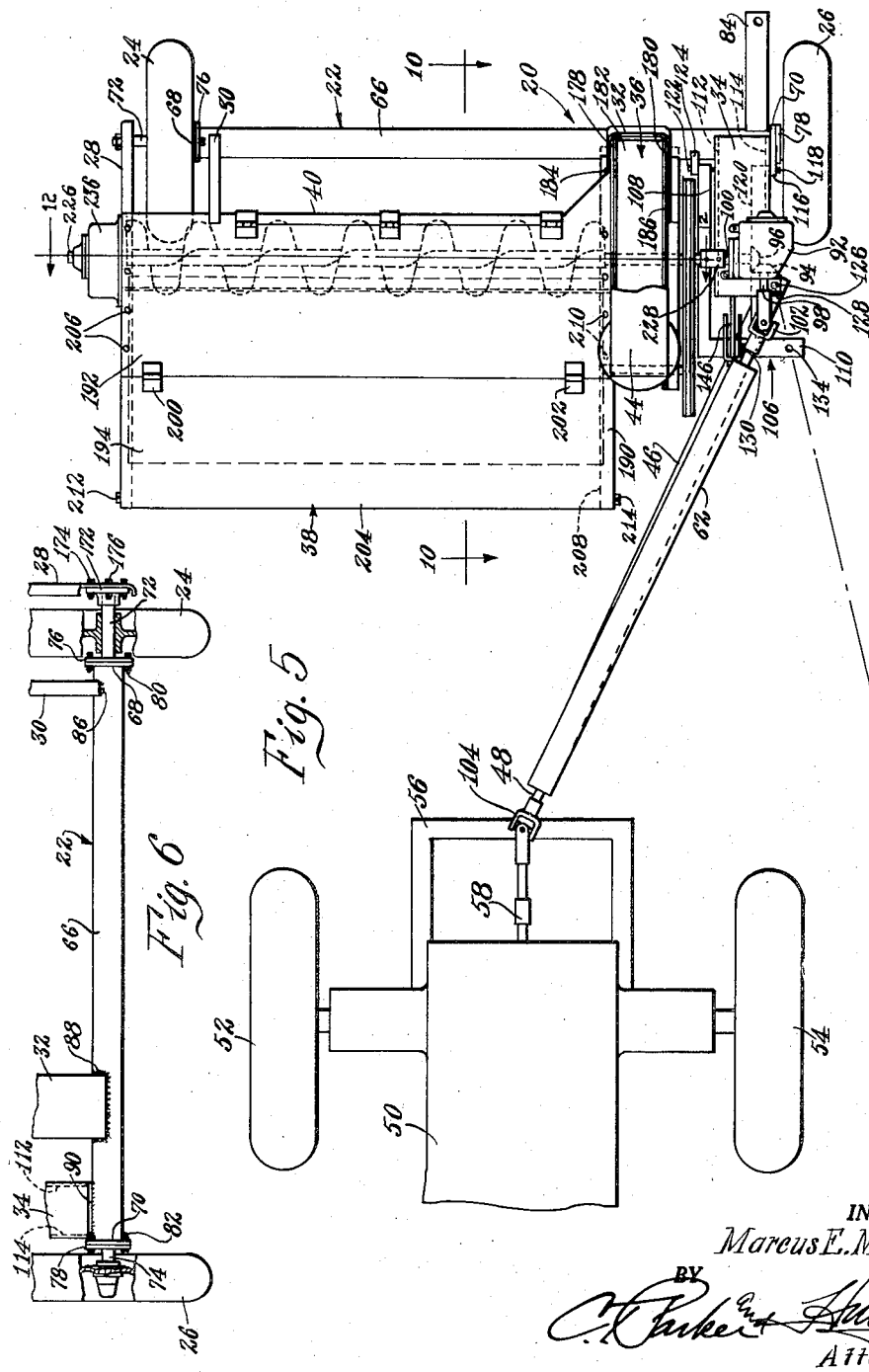
INVENTOR.
Marcus E. McClellan
BY
Attorneys

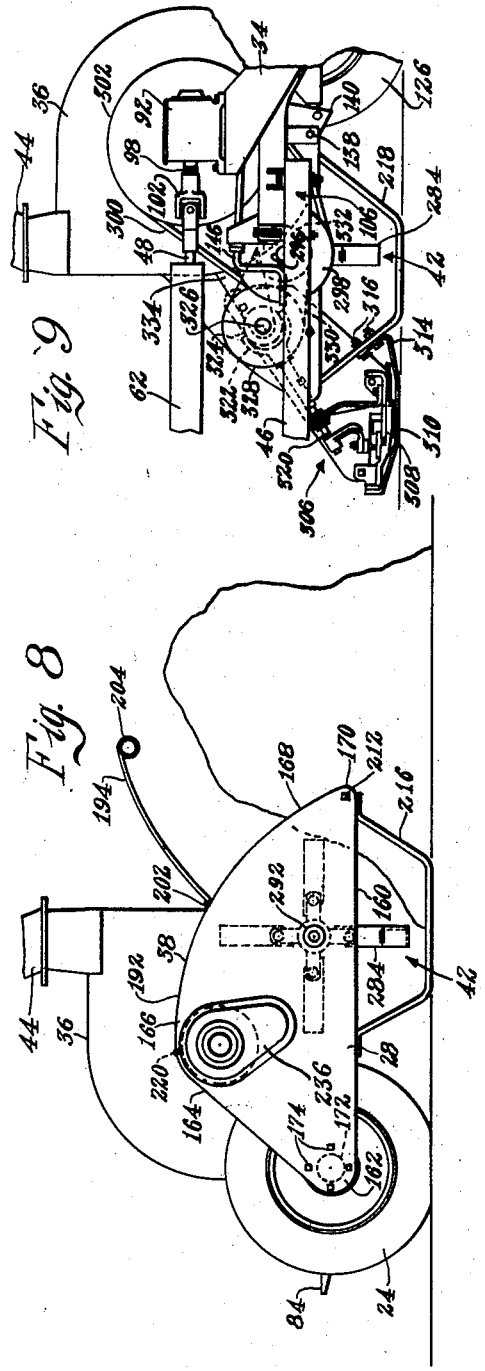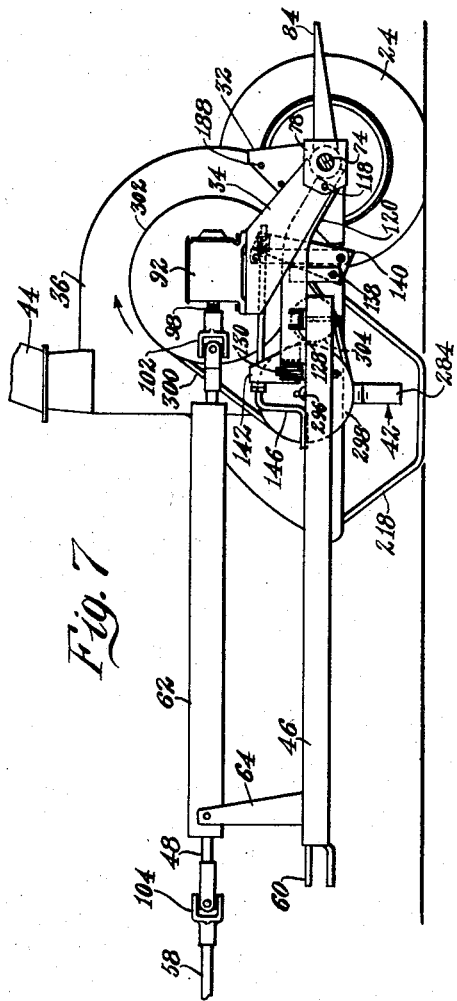

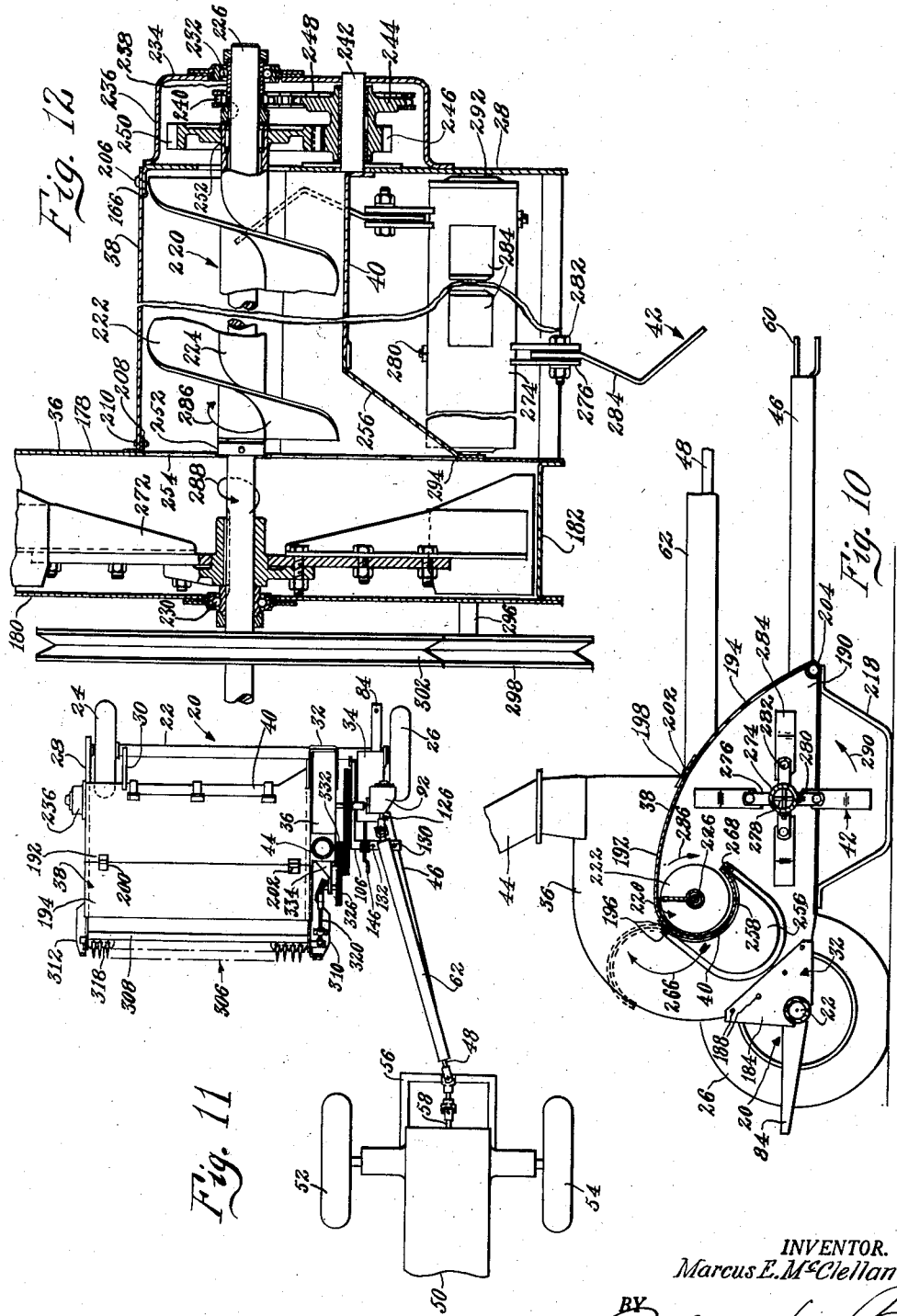

UNITED STATES PATENT OFFICE 2,871,643
Patented Feb. 3, 1959

2,871,643

AGRICULTURAL CROP-HANDLING MACHINE

Marcus E. McClellan, Ottumwa, Iowa, assignor, by mesne assignments, to Deere & Company, a corporation of Delaware Application October 5, 1953, Serial No. 384,114

11 Claims. (Cl. 56—24)

This invention relates to an agricultural crop-handling machine and more particularly to that class of machine generally known as a forage harvester.

The primary function of a forage harvester is to collect agricultural crops from a field, to treat these crops by reducing them, and to deliver the reduced crops to a receptacle, which is normally a wagon trailing behind the machine; although, in some cases previously collected crops may be gathered and stored temporarily and subsequently fed to the machine. The basic requirements for a machine of this character are many, and probably the most desirable machine is one that is of universal application; that is to say, one that will handle a large variety of crops. Further, the machine should be relatively simple in design and construction so that its initial as well as its operating costs are kept to a minimum.

According to the present invention, these basic requirements are met in a novel manner by the provision of a machine comprising a mobile frame adapted to advance over the field and having crop-reducing means capable of handling either previously cut crops or standing crops. The mechanism is so arranged as to deliver directly to a transverse feeder which in turn leads to a blower housing for ultimate delivery of the reduced crops to a convenient receptacle, such as a trailing wagon. In the interests of enclosing the reducing mechanism so as to provide the greatest margin of safety and to confine the crops being handled, the machine includes an enclosure in the form of a hood open at its front and bottom so that the reducing mechanism may receive crops. It is a further feature of the invention to provide the hood in the form of a plurality of sections, one of which is movable, preferably by being hinged to the other section, so that the machine can be moved into position adjacent a heap or pile of crops such as will typically be found in a trench or pit silo. The hinged cover enables a greater portion of the crop-reducing mechanism to be exposed and the machine can be advanced into the pile for collecting crops from the pile and feeding them to the conveyor or feeder in the machine. This result is possible because of the pickup function of the reducing mechanism, which in itself is rather unconventional in the present environment, because it combines the pickup function with a cutting function, thus eliminating the need for separate cutting means.

However, there are instances in which a separate cutting mechanism may be required in conjunction with the reducing mechanism. Accordingly, it is a further feature of the present invention to provide a cutter bar or sickle attachment for the machine, which attachment functions to cut the standing crops as the machine advances, whereby the crops fall rearwardly over the cutting mechanism to be picked up and further reduced by the reducing mechanism while being transferred to the feeder and ultimately to the rotor or blower housing that serves to transfer the crops to the associated receptacle.

A still further object of the invention resides in an improved main frame structure comprising essentially a transverse axle means having thereon a plurality of supporting arms in the form of cantilevers on which the various components of the machine are supported. Associated with the main frame is a draft tongue that is articulately connected to the axle means, and adjusting means is provided between this frame member and one of the cantilever arms so that the height of the reducing mechanism above the ground may be varied at will.

Further features of the invention reside in an improved auger conveyor construction in which the bottom portion of the trough is movable to provide access to the auger; enclosing shield or hood structure combining part of the supporting frame as well as part of the associated blower or rotor housing; improved driving mechanism for the associated parts, in which the auger conveyor is driven directly from the rotor but at a different speed; and improved driving mechanism for the crop-reducing means, comprising shock-absorbing, power-transmitting means.

In addition to the foregoing, the invention embraces other features and objects flowing inherently from the novel combinations, subcombinations and elements that go to make up the machine, a preferred embodiment of which is illustrated in the accompanying sheets of drawings and described in the following specification.

In the drawings:

Fig. 1 is a three-quarter perspective view of the machine as seen from the front.

Fig. 2 is a three-quarter perspective view of the machine as seen from the rear.

Fig. 3 is a fragmentary view, partly in section and drawn to an enlarged scale, illustrating the adjusting means for the main frame and draft member.

Fig. 4 is a sectional view as seen along the line 4—4 of Fig. 3.

Fig. 5 is a plan view of the machine, showing its association with a tractor in transport position, a dot-dash line being used to illustrate the position of the draft tongue when the tractor and machine are operating.

Fig. 6 is a fragmentary plan view, partly in section, showing some of the details of the transverse axle means.

Fig. 7 is a side elevational view, with the left-hand wheel removed, as seen from the left-hand side.

Fig. 8 is an elevational view of the machine as seen from the right-hand side and showing the use of the machine in attacking a crop heap.

Fig. 9 is a fragmentary side elevational view of the machine as seen from the left-hand side, showing the sickle attachment for the machine.

Fig. 10 is a longitudinal sectional view as seen along the line 10—10 of Fig. 5.

Fig. 11 is a plan view of the machine as used with a tractor in operating position, the view also illustrating the sickle attachment.

Fig. 12 is a transverse sectional view, on an enlarged scale and "telescoped" to conserve space, as seen along the line 12—12 of Fig. 5.

The invention may perhaps be best understood by considering it generally with reference first to Figs. 1 and 2 and then specifically with reference to the other figures. In this respect, it should be borne in mind that directional and specifically descriptive terms are used for purposes of convenience and not for engrafting any limitations upon the spirit and scope of the invention.

The machine comprises a mobile main frame structure 20 including a transverse axle means 22 supported respectively at its right- and left-hand ends by right- and left-hand ground-engaging wheels 24 and 26. The main frame structure also includes a plurality of supporting members 28, 30, 32 and 34, each rigidly affixed at its rear end to the axle means 22 and extending forwardly therefrom as a cantilever arm. The support or cantilever arm 28 is in the form of an end closure positioned at the right-hand side of the machine in transversely spaced relation to blower housing 36 and between the two are supported an enclosure or hood means 38 and a conveyor trough 40. The hood 38 encloses the upper portion of crop-reducing means, in the form of a rotor, and designated generally by the numeral 42, which functions to collect crops from the field (or from a heap as will be hereinafter described) and to deliver such crops rearwardly to the conveyor trough 40 whence the crops are moved into the blower housing 36 for ultimate discharge from the housing via a discharge spout 44.

The machine is adapted to advance over a field under any suitable motive power. For that reason, the main frame structure has connected thereto a forwardly extending draft member or tongue 46 and further includes a propeller shaft 48 by means of which power may be supplied to the machine for driving its operative components.

Figs. 5 and 11 illustrate the association of the machine with a draft vehicle such as an agricultural tractor having a main body 50 carried at its rear end on a pair of traction wheels 52 and 54 and equipped with a drawbar 56 and a conventional power take-off shaft 58. The forward end of the draft tongue or member 46 has a conventional clevis 60 (Figs. 7 and 10) for effecting connection of the tongue to the drawbar 56. The propeller shaft 48 is supported in part in a shield structure 62 that is itself supported from the tongue 46 by a standard 65.

The transverse axle means or assembly 22 is best shown in Fig. 6, wherein it is seen that the axle means comprises a torsion member, the central part of which is in the form of a tube 66 having its opposite ends flanged at 68 and 70. Stub axles 72 and 74 respectively journal the wheels 24 and 26 and respectively have mounting flanges 76 and 78 rigidly thereon. The flange 76 is rigidly secured to the right-hand end flange 68 of the tube 66, as by a plurality of bolts 80. The flange 78 of the left-hand stub axle 74 is similarly secured to the left-hand flange 70 of the axle tube 66 by means of a plurality of bolts 82.

In addition to the cantilever supporting arms 28, 30, 32 and 34, the axle assembly 22 has rigidly connected thereto a rearwardly projecting draft member 84 to provide means for the connection to the machine of a trailing wagon which will receive material discharged from the blower spout 44.

The cantilever supports 30, 32 and 34 are rigidly secured to the axle tube 66 as by welding thereto respectively at 86, 88 and 90. The left-hand outermost support arm 34 extends upwardly and forwardly (Fig. 7) to provide a support for driving mechanism, here comprising a gear box 92 containing meshing bevel gears 94 and 96 and journaling a forwardly projecting input or driving shaft 98 and a transversely extending driven or blower-driving shaft 100. The shafts 98 and 100 are keyed respectively to the bevel gears 94 and 96. The forward portion of the input shaft 98 projects ahead of the gear box 92 and is connected by a universal joint assembly 102 to the rear end of the propeller shaft 48. The forward end of the propeller shaft is connected by a second universal joint assembly 104 to the tractor power take-off shaft 58. Inasmuch as the support 34 is rigidly secured to the axle tube 66 and the gear box 92 is rigidly secured to the support, a unitary structural relationship is accomplished that is important with respect to the driving of the rotating parts of the machine, the details of which will presently appear.

The draft member or tongue 46 is connected to the main frame structure 20 by means of an intermediate or secondary draft frame comprising an L-shaped element 106 having a fore-and-aft extending leg 108 and a transverse leg 110. The supporting member 34 is of channel shape in cross section and has inner and outer walls 112 and 114. The left-hand flange 70 on the axle tube 66 has a forward projection 116 which lies alongside a portion of the outer wall 114 of the cantilever support arm 34. The extension 116 and the wall just referred to are apertured in alignment to receive a pivot pin 118 on which is mounted a fore-and-aft brace member 120 rigidly joined at its forward end to the transverse leg 110 of the draft frame element 106. The inner wall 112 of the cantilever arm 34 receives a second pivot pin 122 coaxial with the pin 118 and supported between the wall 112 and a lug 124 welded to and projecting forwardly from the left-hand end portion of the axle tube 66. The pivot pin 122 forms a pivotal connection for the fore-and-aft leg 108 of the draft frame element 106. Thus, the pins 118 and 122, being coaxial, comprise means for articulately connecting the draft frame element 106 to the main frame structure 20. The draft frame element establishes means for connecting the draft tongue 46 to the main frame structure, since the rear end portion of the draft tongue member 46 is pivotally connected on a vertical axis by a pin 126 to a transverse support 128 that rigidly cross-connects the brace 120 and the fore-and-aft leg 108 of the draft frame element. Because of the pivotal connection at 126, the draft tongue 46 is capable of swinging between the full- and broken-line positions of Fig. 5 (the broken-line position corresponds to the full-line position of the draft tongue in Fig. 11). The tongue may be selectively secured in either one of these positions by means comprising a locking pin 130 receivable by the draft tongue 46 and selectively receivable by either of two apertures 132 or 134 in the transverse part 110 of the draft frame element 106.

In normal circumstances, whether the machine is operating or being transported, the connections 126 and 130 of the draft tongue 46 to the draft frame element 106 rigidify the two against relative movement both vertically and laterally. When lateral adjustment of the draft tongue 46 is necessary, only the pin 130 need be removed so that the tongue may pivot about the pin or bolt 126. When it is desired to remove the draft tongue entirely, which will facilitate use of the machine as shown in Fig. 8, both pins or bolts 126 and 130 may be removed. Thus, these pins or bolts constitute means removably connecting the draft tongue 46 to the main frame structure.

In addition to its lateral adjustment, the tongue 46, together with the element 106, may be adjusted vertically relative to the main frame structure. This is possible because of the articulate connection established by the coaxial pivot pins 118 and 122. Adjustment is accomplished between the element 106 and the cantilever arm 34. Since, as previously stated, the arm 34 is rigid on the axle tube 66, as are the other supports 28, 30 and 32, relative vertical movement between the structure 46—106 and the arm 34 effects vertical adjustment of the main frame structure 20. For the purposes of effecting this adjustment, the element 106 has rigidly depending therefrom a support 136, to the lower end of which is pivoted at 138 a bell crank 140. The forward portion of the element 106 has rigidly affixed thereto a standard 142 in which is journaled at 144 an operating member in the form of a crank 146 having its rear end threaded at 148 through a trunnion nut 150 that is in turn pivotally connected at 152 to the upper end of the bell crank 140. Turning of the crank 146 thus causes the bell crank to move selectively in either fore-and-aft direction about the pivot 138. The lower portion of the bell crank is pivotally connected at 154 to the lower end of an upright link 156, the upper end of which is pivotally connected at 158 to the inner wall 112 of the cantilever arm 34. Thus, as the bell crank 140 is rocked in one direction or the other, forces are transmitted through the link 156 to the cantilever arm 34 to pivot the main frame structure upwardly or downwardly about the pivot axis 118—122. The purpose of this adjustment is to regulate the height of the crop-reducing rotor or crop-collecting means 42 relative to the ground. Such adjustment is necessary to accommodate different crop conditions.

The right-hand cantilever arm 28 is in the form of an end enclosure having a substantially horizontal lower edge 160 and being otherwise of somewhat arcuate or semi-circular shape, including a rounded rear end portion 162 fairing into an upwardly and forwardly inclining edge 164 that in turn adjoins an upper curved edge portion 166 disposed at a level slightly above that of the conveyor trough 40. The upper edge portion 166 continues thence downwardly and forwardly at 168 and adjoins the horizontal lower edge 160 in a rounded front corner 170. The member 28 is of flanged construction (Fig. 6) and therefore has the characteristic of strength as well as constituting a closure member as aforesaid. The manner of mounting the member 28 on the axle assembly is shown in Fig. 6. The mounting means comprises a flanged cap member 172 rigidly secured to the rear end portion 162 of the member 28 by means of a plurality of bolts 174 and rigidly affixed to the stub axle 72 by means of a pin 176. The cantilever effect of the member 28 is secured because of the connection just described, in view of the fact that the stub axle 72 is itself rigidly secured to the central axle tube 66 by means of the cooperating flanges 68 and 76 and securing bolts 80.

The blower housing 36 comprises upright, fore-and-aft extending inner and outer side plates 178 and 180 and an annular band 182 disposed between the plates and rigidly secured thereto to constitute the housing, which to that extent is somewhat conventional. The band is, of course, opened to communicate with the discharge spout 44. As best seen in Figs. 2 and 5, the cantilever arm 32 is of U-shaped construction as seen from above and has forwardly extending legs 184 and 186 that embrace the rear portion of the housing 36 and are respectively rigidly secured, as by rivets 188, to the housing side plates. The housing thus in effect forms a unitary part of the cantilever arm 32 and cooperates with the outer cantilever arm 28 in supporting the crop-reducing means 42, the hood 38, the conveyor trough and associated parts, as will be hereinafter described in detail.

As best seen in Fig. 5, the right-hand cantilever arm 28 has its forward portion 170 considerably ahead of the housing 36 and for that reason the inner plate 184 of the housing 36 has a forward extension, designated generally by the numeral 190, that is in transverse alinement with the forward portion of the arm or support 28. Thus, the inner support, as constituted by the extension and the associated side of the housing 36 is symmetrical as respects the outer support arm 28 and the hood 38 extends across between these two supports to add additional rigidity to the structure. The hood 38 comprises a plurality of sections, preferably two, designated by the numerals 192 and 194. The section 192 constitutes a rear section and extends from a transverse rear edge 196 to a transverse front edge 198, which front edge lies along a hinge axis between a pair of transversely spaced hinge elements 200 and 202 which carry the front section 194 for movement relative to the rear section. The rear edge of the front section lies along the line 198 and the front edge of the front section, seen at 204, extends between the extreme forward portions of the supports 28 and 190 at a level relatively closely spaced above the ground to provide for exposing the lower forward portion of the crop-reducing means 42.

As stated above, the upper edge 166—168 of the outer support arm 28 is flanged and the right-hand outer edge of the rear hood section 192 is rigidly secured to this flange as by means of a plurality of rivets 206. The extension 190 on the housing 36 is also flanged, as at 208, and the inner or left-hand end of the rear hood section 192 is riveted at 210 to this flange. The front section of the hood is, of course, free for hinging movement about the hinges 200 and 202 and may be broadly considered as removable as respects the crop-reducing means 42, since, as a matter of fact, the hood section could be completely removed if desired. During normal operation in treating crops lying on the ground in the form of swaths or crops still growing in the field or otherwise ground-borne, as distinguished from collecting crops from a pile as shown in Fig. 8, the front hood section 194 will be in its closed or downward position, in which position it may be maintained by any suitable securing means, representative forms of which are shown as removable cap screws 212 and 214 passed respectively through the front portions of the support members 28 and 190. The supports 28 and 190 respectively have depending U-shaped guards 216 and 218 that add to the enclosure of the crop-reducing means 42 as a safety measure. These guards further serve as legs for supporting the machine against forward tipping when it is disconnected from the tractor.

The conveyor trough 42 constitutes part of conveyor means, designated generally by the numeral 220. This conveyor means includes a transverse movable element in the form of an auger 222 mounted on a hollow central shaft 224. The auger shaft is suitably journaled on and loosely receives a central driving shaft 226 that is coupled at its left-hand end at 228 to the driven shaft 100 that projects laterally from the gear box 92. Thus, the shaft 226 receives its power initially from the power take-off 58 of the tractor via the propeller shaft 48 and input shaft 98. The shaft 226 is journalled adjacent its left-hand end in a bearing 230 in the left-hand side plate 180 of the blower housing 36 and at its right-hand end in a bearing 232 carried in an outer wall portion 234 of an auxiliary casing 236 that is rigidly mounted on the outside or right-hand surface of the cantilever support 28. Journaling of this right-hand end portion of the shaft 226 is effected by means of a hub 238 keyed to the shaft and having affixed thereto a driving sprocket 240. A countershaft 242 is arranged parallel to the driving shaft 226 and carries a driving member including a sprocket 244 and an integral spur gear 246. A driving chain 248 connects the sprockets 240 and 244 and the spur gear 246 meshes with a somewhat larger spur gear 250 keyed to the right-hand ent portion of the hollow auger shaft 224. The sprocket and gearing just described comprise speed-reducing means for driving the auger shaft 22 from the shaft 226 but at a speed of rotation lower than that of the shaft 226. Needles bearings, as at 252, may be used as the bearings for journaling the auger shaft 224 on the shaft 226, it being understood that similar needle bearings will be disposed at the left-hand end of the auger shaft. A pinned collar 252, secured to the left-hand end portion of the shaft 226, abuts the left-hand end portion of the auger shaft and prevents axial displacement of the auger toward the housing 36.

The outer or right-hand side plate 178 of the housing 36 has a feed inlet opening 254 therein toward which the conveyor 220 leads. This opening is somewhat larger than the conveyor means and a funnel portion 256 encircles the lower portion of the feed opening and connects the housing to the conveyor trough 40. However, a major portion of the conveyor trough 40 is movable relative to the other parts of the conveyor means and to this end the auger trough has its intermediate portion, designated by the numeral 258, hinged along its upper edge by a plurality of transversely coaxial hinges 260, 262 and 264 to the rear edge 196 of the hood section 192. As shown in dotted lines in Fig. 10, the hinged section 258 may be swung from its full-line position in the direction of the arrow 266. Releasable means, such as represented by the numeral 268, may be employed to maintain the section 258 in its normal or operating position. The purpose of the movability of the trough section is to provide access to the auger in the event that cleaning or other service is required and also to enable discharge of crops directly to the ground without using the blower housing. The trough section 258 is intermediate the funnel section 256, already described, and a permanently fixed outer trough section 270, which is rigidly carried between the inner side of the outer support arm 28 and the next adjacent support arm 30. Thus, between the housing 36 and the outer support 28, the main frame structure is unified by the supporting arms 32 and 28, plus the rigidly fixed rear hood section 192 and adjoining funnel 256 and non-movable trough section 270, and the structure is not weakened, for all practical purposes, by the movability of either the trough section 258 or the front hood section 194.

As will be seen, the conveyor means 220 and the housing 36 are coaxial. A rotary element in the form of a fan or blower 272 is keyed to the shaft 226 and runs between the housing side plates 178 and 180 to deliver through the spout 44 material delivered to the housing by the conveyor means 220, the blower in its functional aspect being therefore typical of known constructions. However, there is important significance to the coaxial arrangement of the gear box 92, blower 272 and conveyor means 220. Not only does the coaxial arrangement permit a compact organization of parts, but the drive to the conveyor means is simplified and the supporting of the auger is greatly improved, particularly since the auger must be open at its delivery or discharge end (blower proximate end). The tubular arrangement comprising the auger trough and the fixed section 192 of the hood, together with the shafting 224 and 226, adds to the unitary structural characteristics of the main frame structure.

The crop-reducing rotor or crop-collecting means 42 is here shown as comprising a central rotor shaft 274 having a plurality of axially and angularly spaced lugs 276 rigid thereon. Each of these lugs is preferably secured to the tubular shaft 274 by being formed integral with a threaded shank portion 278 to the opposite end of which is secured a lock nut 280. Each of the lugs has pivotally connected thereto by a pin 282 a crop-engaging arm or blade 284. In the particular case shown, the blade 284 is of angled or offset configuration and functions not only to pick up the crops but to sever standing crops from the ground if the machine is operated over a field of such crops. As best seen in Fig. 12, the blades are staggered or spirally arranged on the supporting shaft 274. The direction of rotation of the device or means 42 is counterclockwise as seen in Figs. 8 and 10, the knives or blades 284 thus constituting radially projecting portions adapted to sweep forwardly and then upwardly to carry the crops beneath the hood 38 and into the auger trough 40. Because of the drive of the auger from the blower 272, the direction of rotation of the auger is clockwise, as viewed in Figs. 8 and 10, whereas the direction of rotation of the blower 272 would be counterclockwise, as seen in Figs. 8 and 10. Arrows 286 and 288 respectively designate the directions of rotation of the auger and blower in Fig. 12. The arrow 286 appears also in Fig. 10 and an arrow 290 is used in Fig. 10 for purposes of convenience to designate at a glance the direction of rotation of the device 42.

The crop-reducing means or rotor shaft 274 is appropriately carried at its opposite ends respectively in bearings 292 and 294 mounted respectively in the supporting members 28 and 190. The shaft 274 has a coaxial stub shaft projection 296 at its left-hand end and a sheave 298 is keyed to this stub shaft to receive a driving belt 300. This belt is trained about a larger sheave 302 that is keyed to the shaft 226 intermediate the housing 36 and the gear box 92. A belt tightener or idler 304 may be used intermediate the sheaves 298 and 302 (Fig. 7). The use of the flexible belt 300 for transmitting drive from the shaft 226 to the crop-reducing means 42 via the sheaves 302 and 298 serves to absorb shocks imposed on the device 42 in the event that the device encounters obstacles or particularly heavy crops. Consequently, these shocks are not transmitted to the blower and therefore the balance of the blower is not upset.

As will be noted from Figs. 5 and 11, the location of the housing 36, gear box 92, drive 298—300—302 at the left-hand side of the machine places the weight of these heavy parts in a position where it offsets at least part of the relatively great weight of the collecting rotor or reducing device 42; and thus much of the excessive side draft found in prior machines arranged in this manner is eliminated. Furthermore, all of the driving mechanism is at one end of the machine where it can be readily serviced and lubricated. The particular location of the housing 36 enables the towing of a wagon directly behind the left-hand side of the machine and thus the wagon occupies a position more in line with the line of draft force than if the blower housing were otherwise located and required connection of the wagon, say, at the right-hand side of the machine. Accordingly, this arrangement still further minimizes side draft.

As a further adjunct to the provision of a suitable machine having flexibility and universal application to a large variety of crops, a sickle attachment, best shown in Figs. 9 and 11 and designated generally by the numeral 306, is provided. This sickle attachment comprises a transverse cutter or sickle bar 308 having a left-hand shoe 310 and a right-hand shoe 312. These shoes are provided with suitable attaching brackets, such as designated at 314 in Fig. 9, it being understood that a similar bracket is mounted on the right-hand shoe 312 for attachment to the right-hand guard 216. As shown in Fig. 9, the bracket 314 is secured to the left-hand guard 218 as by a pair of removable bolts 316. The cutter bar carries a reciprocating sickle 318 driven at its left-hand end from a wobble shaft 320, an arrangement not unlike that shown in the U. S. Patent to Paradise 2,297,317. The shaft 320 has at its upper end a yoke 322 driven by a woble member 324 angularly related to a driving shaft 326. The shaft 326 has keyed thereto a sheave 328 and a belt 330 is trained about this sheave and about a sheave 332 keyed to the shaft 296. When the sickle attachment is used, the shaft 326 is appropriately supported in a bracket 334 removably connected to a forward portion of the rotor housing 36.

In the use of the machine without the sickle attachment and for treating either standing crops or crops lying on the field after having been previously cut, the machine is towed by the tractor in offset relation as illustrated in Fig. 11. The blades or knives 284 engage the crops and, if the crops are standing or growing, sever the crops from the ground and transfer the crops upwardly and rearwardly beneath the hood 38 to the conveyor means 220, whence the crops are moved laterally into the housing 36 for ultimate delivery by the blower 272 through the spout 44 to any convenient receptacle, such as a wagon connected to the machine via the wagon hitch 84. The rotor 42 rotates at a relatively high speed and the crops picked up and collected thereby are reduced or chopped into short lengths for easy handling by the conveyor means 220 and blower 272. If the crops are lying in swaths or windrows, the rotor 42 need not, of course, sever the crops from the ground but merely picks the crops up and handles them in the fashion just described.

When the sickle bar attachment is used, which may be desirable in particular crops, the sickle or knife cuts the crops and as the machine advances the severed or cut crops fall rearwardly over the cutter bar and back onto the ground but directly in front of the rotor 42. The rotor therefore functions to pick up the severed crops and treats them as previously described. Consequently, the basic machine functions in all respects in similar manners regardless of the type of crop being handled.

As shown in Fig. 8, the draft tongue 46 may be removed and the front hood section 194 hinged upwardly to expose a greater portion of the rotor 42. Thereupon, the machine may be moved into a pile or heap of material, representative of which is the conventional storage of material in pit or trench silos, for example. Power may be supplied to the machine in any suitable manner by either connecting the tractor power take-off shaft directly to the input shaft 98 or by any other suitable means. Because of the platform nature of the upper portion of the support arm 34, the gear box 92 may be replaced with a source of power such as an internal combustion engine conventionally used on harvesting machines. In that case, operation of the machine according to the approach of Fig. 8 will be facilitated, since there will be no need to rearrange the drive or to position the tractor so as not to interfere with the pile of material being operated upon. In any event, the machine, with the hood 38 opened as illustrated, may be forced into the pile and the rotating device 42 will collect crops from the pile and transfer them rearwardly into the conveyor means 220 for ultimate disposal as previously described.

Various other features of the invention not specifically enumerated will undoubtedly occur to those versed in the art, as will numerous modifications and alterations in the preferred embodiments of the invention illustrated, all of which may be achieved without departing from the spirit and scope of the invention.

What is claimed is:

1. An agricultural material handling machine adapted to advance over a field, comprising: transverse main frame structure; a crop-handling housing carried on and adjacent to one end of the main frame structure and enclosing a rotary element mounted for rotation on a transverse horizontal axis, said housing having transversely spaced apart opposite sides; drive mechanism supported at said one end of the main frame structure and at one side of the housing and including a forwardly projecting input shaft and a transverse output shaft driven by the input shaft and coaxial with and connected to the rotary element; transverse conveyor means mounted on the main frame structure at and leading to the other side of the housing and having a housing-remote end adjacent to the other end of the main frame structure; a hollow shaft journaled as respects the housing and rotary element and connected to and for driving the conveyor means; a drive shaft extending coaxially through said hollow shaft and having one end within the housing and connected to the rotary element and having its opposite end projecting axially beyond the other end of said hollow shaft; speed-reduction drive means interconnecting the projecting end of the drive shaft and said proximate end of the hollow shaft to drive the conveyor means via said hollow shaft at a speed different from that of the rotary element; crop-collecting means on the main frame structure ahead of the conveyor means and operative to collect crops and deliver them rearwardly to said conveyor means, said crop-collecting means having a rotatable driven member substantially directly ahead of the crop-handling housing; a rotatable driving member coaxial with and keyed to the aforesaid driving shaft; and an endless drive element trained about said driving and driven members to drive the crop-collecting means directly from said driving shaft.

2. An agricultural material handling machine adapted to advance over a field, comprising: transverse main frame structure; a crop-handling housing carried on and adjacent to one end of the main frame structure and containing a rotary element mounted therein for rotation on a transverse horizontal axis; drive mechanism supported at said one end of the main frame structure and at one side of and in transverse alinement with the crop-handling housing and including a coaxial driving connection to the rotary element; conveyor means mounted on the main frame structure and leading to the other side of the crop-handling housing, said conveyor means having one end proximate to and its opposite end remote from the crop-handling housing; means interconnecting the rotarry element and the conveyor means to drive the conveyor means at a speed different from that of the rotary element; crop-collecting means on the main frame structure ahead of the conveyor means and operative to collect crops and deliver them rearwardly to said conveyor means; and drive means interconnecting the crop-collecting means and the aforesaid drive mechanism to drive the crop-collecting means.

3. An agricultural crop handling machine adapted to advance over a field, comprising: mobile supporting structure; conveyor means carried by said structure and including a transverse conveyor trough and elements movable transversely in said trough to a discharge zone, said trough having transverse front and rear edges; crop-receiving means connected to said structure adjacent to said discharge zone to receive crops from the conveyor means; a rotary crop-collecting device on and extending transversely across said structure ahead of the conveyor means and rotatable about a transverse axis to collect ground-borne crops and to deliver such crops rearwardly over the front edge of the trough for ultimate transfer to the crop-receiving means; tunnel-shaped housing means extending transversely over both the upper portion of the rotary device and the conveyor means, and including a rear part adjoining the rear edge of the trough and extending forwardly over the movable elements in close crop-confining relation thereto and closely spaced above the front edge of the trough to define with said front edge a relatively vertically narrow transverse crop inlet to the trough, said rear part extending forwardly beyond said trough front edge to a transverse terminal edge above the rotary device, said housing means further having a separate front part including a rear terminal edge adjoining the terminal edge of the rear part and normally extending forwardly therefrom over and then downwardly in front of the rotary device to a lower transverse edge spaced above the ground to adapt the rotary device normally to engage ground-borne crops at a relatively low level; and means mounting said forward cover part on the said structure on a transverse hinge axis along said adjoining terminal edges and enabling said front part to be swung upwardly and rearwardly for exposing a greater portion of the rotary device to ground-borne crops in heaps and the like at substantially higher levels than the aforesaid normal level.

4. The invention defined in claim 3 including: a draft tongue having a rear end portion adjacent to the rotary device and projecting forwardly from the said structure to a front end portion ahead of said device; and means removably connecting the draft tongue at its rear end portion to said structure to enable disconnection of said tongue and removal thereof for facilitating operation of the machine on crop heaps and the like.

5. An agricultural material handling machine adapted to advance over a field, comprising: mobile supporting structure; transverse conveyor means on said structure and including a transverse auger housing and an auger running therein, said housing having a fixed section and a movable section, said movable section adjoining the fixed section along a transverse junction and normally embracing a rearward portion of the auger so that said sections normally cooperate to closely confine material moved axially by the auger; means separably interconnecting the sections for movement of the movable section away from its normal auger-embracing position to expose said rear portion of the auger; rotatable crop-collecting means carried by said structure ahead of the housing and operative to deliver crops rearwardly and into said housing to be moved axially by the auger when the movable section is normally positioned and to pass rearwardly out of said housing when said movable section is moved away from said normal position; hood means extending forwardly from the housing and over the auger and defining with one of said sections a transverse crop inlet to the auger, said hood means extending thence downwardly ahead of the crop-collecting means to a front edge spaced above the ground to expose lower front portions of the crop-collecting means to crops encountered as the machine advances, 6. An agricultural crop-handling machine adapted to advance over a field, comprising: elongated support means disposed transversely to the line of advance and including wheels at its opposite ends; a crop-handling housing adjacent to one end of the support means and having a rotary element therein journaled on a transverse axis, said housing having opposite, outer and inner upright and fore-and-aft extending side plates relatively closely spaced apart transversely and an annular band between the plates and encircling the rotary element, said inner plate having a feed opening therein; means rigidly mounting the housing on the support means adjacent to said one end; a first fore-and-aft extending supporting member having a rear end portion rigidly affixed to the opposite end of the support means and projecting ahead of said support means in cantilever fashion to a front end portion farther forwardly than the housing and spaced above the ground; extension means rigid on the housing and forming a forward projection having a front end portion transversely and horizontally alined with the front end portion of the supporting member; conveyor means extending transversely between and supported at its opposite ends respectively by the housing and the supporting member and leading to the feed opening in the inner side plate of the rotor housing, said conveyor means having a transversely movable element for feeding crops into said feed opening; crop-collecting means extending transversely between and supported at its opposite ends respectively by the supporting member and the aforesaid extension means on the rotor housing, said crop-collecting means having rearwardly movable elements operative to deliver crops rearwardly to the conveyor means; a second supporting member rigidly affixed to and projecting forwardly in cantilever fashion from the support means alongside the outer side plate of the rotor; a fore-and-aft frame member extending in proximity to said second supporting member and having a rear end portion adjacent to the support means; means pivotally connecting said rear end portion of the frame member to the support means for vertical movement of said frame member relative to said support means and said second supporting member; and adjusting means interconnecting the frame member and the second supporting member for selectively moving said member and second supporting member vertically toward and away from each other to adjust the height of the housing and crop-collecting means as a unit relative to said member.

7. The invention defined in claim 6, including drive mechanism for the rotary element and the crop-collecting means, including power transmitting means carried on the second supporting member adjacent to the outer side plate of the housing and connected to the rotary element and to the crop-collecting means, said drive mechanism being thus adjustable with said housing and crop-collecting means.

8. An agricultural machine adapted to advance over a field, comprising: mobile supporting structure; transverse conveyor means carried by said structure and including a transverse trough and an auger running in said trough, said trough having front and rear transverse edges respectively in front of and behind the auger; means hinging the trough at its rear edge to said structure for downward and rearward swinging to expose the auger; releasable means cooperative between the trough and said structure for normally holding the trough against swinging; crop-collecting means carried by the main frame structure ahead of the trough and operative to deliver crops rearwardly and over said front edge and into the trough to be moved by the auger; said structure including hood means positioned transversely over the trough and over the crop-collecting means and including a cover part having a rear transverse edge adjoining the rear transverse edge of the trough, said hood means extending thence forwardly in vertically spaced relation to the front edge of the trough and thence downwardly ahead of the crop-collecting means to a front edge spaced above the ground to expose lower front portions of the crop-collecting means to crops encountered as the machine advances.

9. The invention defined in claim 8, in which: the cover part is in a plurality of transverse sections, comprising at least a front section and a rear section adjoining each other along a transverse line of separation; and means is provided between said sections for movably mounting the front section for movement away from the crop-collecting means to expose additional forward portions of said crop-collecting means.

10. An agricultural crop-handling machine adapted to advance over a field, comprising: a wheeled support means positioned transversely to the line of advance; a pair of cantilever arms projecting generally horizontally forwardly respectively from opposite end portions of the support means, said arms respectively having transversely alined first supporting portions relatively closely ahead of the support means and spaced above the ground and further respectively having transversely alined second supporting portions ahead of said first supporting portions and spaced above the ground; a crop-handling assembly comprising an elongated conveyor means positioned bodily ahead of the support means and having at one end a crop-delivery means, said assembly being arranged with the length of the conveyor means running between the first supporting portions, with the crop-delivery means supported on one of said first supporting portions and the other end of the conveyor means supported on the other of said first supporting portions; and crop-reducing means extending transversely between the second supporting portions and including a rotatable device having opposite ends supported respectively by said second supporting portions on a transverse horizontal axis, said device having elements spaced radially from said axis to directly engage ground-borne crops in a swath between said cantilever arms as the machine advances and to deliver such crops upwardly and rearwardly into the conveyor means.

11. The invention defined in claim 10, including: a fore-and-aft frame member having one end portion adjacent to the support means and lying in proximity to one of the cantilever arms; means articulately connecting said one end portion of the frame member to the support means for vertical movement of said frame member relative to the support means, arms, crop-handling assembly and crop-reducing means; and adjusting means interconnecting the frame member and said one cantilever arm for effecting such vertical movement selectively in opposite directions to adjust the height of the crop-handling assembly and the crop-reducing means as a unit relative to said frame member.

References Cited in the file of this patent

UNITED STATES PATENTS

| | | |
|---|---|---|
| 2,496,493 | Raney | Feb. 7, 1950 |
| 2,520,107 | Vutz | Aug. 22, 1950 |
| 2,526,141 | Knowlton | Oct. 17, 1950 |
| 2,592,928 | Martin | Apr. 15, 1952 |
| 2,641,097 | Mast | June 9, 1953 |
| 2,663,985 | Hinson | Dec. 29, 1953 |
| 2,669,919 | Freeman | Feb. 23, 1954 |
| 2,725,704 | Skromme | Dec. 6, 1955 |